United States Patent
Park et al.

(10) Patent No.: US 12,304,408 B2
(45) Date of Patent: May 20, 2025

(54) VEHICLE FRONT BUMPER SYSTEM

(71) Applicants: HYUNDAI MOTOR COMPANY, Seoul (KR); KIA CORPORATION, Seoul (KR)

(72) Inventors: Tae Ou Park, Seoul (KR); Byeong Do An, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 85 days.

(21) Appl. No.: 17/387,700

(22) Filed: Jul. 28, 2021

(65) Prior Publication Data
US 2022/0105886 A1 Apr. 7, 2022

(30) Foreign Application Priority Data
Oct. 5, 2020 (KR) .......... 10-2020-0128299

(51) Int. Cl.
*B60R 19/18* (2006.01)
*B60R 19/03* (2006.01)
*B60R 19/24* (2006.01)

(52) U.S. Cl.
CPC .............. *B60R 19/18* (2013.01); *B60R 19/03* (2013.01); *B60R 19/24* (2013.01)

(58) Field of Classification Search
CPC ......... B60R 19/18; B60R 19/24; B60R 19/03; B60R 19/04; B60R 2019/1853; B60R 19/023; B60R 19/48; B60R 2019/1806; B60R 2019/486

USPC ........................................ 293/120, 154, 155
See application file for complete search history.

(56) References Cited

U.S. PATENT DOCUMENTS

| | | | | |
|---|---|---|---|---|
| 1,697,498 | A * | 1/1929 | Fageol | B60R 19/12 293/122 |
| 7,198,309 | B2 * | 4/2007 | Reynolds | B60R 19/18 293/122 |
| 9,205,790 | B2 * | 12/2015 | Yabu | B60R 19/04 |
| 10,407,011 | B2 * | 9/2019 | Steinebach | B60R 19/023 |
| 10,894,521 | B2 * | 1/2021 | Patberg | B60R 19/03 |
| 10,913,415 | B2 * | 2/2021 | Kim | B60R 19/18 |
| 11,338,749 | B2 * | 5/2022 | Wright | B60R 19/18 |

(Continued)

FOREIGN PATENT DOCUMENTS

| | | | | |
|---|---|---|---|---|
| EP | 1199224 A1 * | 4/2002 | ............ | B60J 5/0437 |
| EP | 2322387 B1 | 5/2011 | | |

(Continued)

OTHER PUBLICATIONS

JP-6265889-B2 computer translation (Year: 2018).*

(Continued)

*Primary Examiner* — Joseph D. Pape
(74) *Attorney, Agent, or Firm* — Lempia Summerfield Katz LLC

(57) ABSTRACT

A front bumper system of a vehicle includes a bumper beam disposed on a front end of the vehicle, and the bumper beam has a plurality of openings which are open toward a cooling module disposed within a front compartment of the vehicle. The bumper beam has a plurality of ribs by which the plurality of openings are defined, and each rib has a streamlined cross-section whose thickness gradually decreases from the front of the vehicle toward the rear of the vehicle.

10 Claims, 11 Drawing Sheets

(56) References Cited

U.S. PATENT DOCUMENTS

| | | |
|---|---|---|
| 2006/0214439 A1 | 9/2006 | Reynolds |
| 2011/0109122 A1 | 5/2011 | Clausen et al. |
| 2013/0175813 A1* | 7/2013 | Mana ................. B60R 19/18 293/120 |
| 2015/0015006 A1* | 1/2015 | Yabu .................. B29C 70/345 293/120 |
| 2015/0061320 A1* | 3/2015 | Yabu .................. B60R 19/24 293/133 |
| 2017/0144618 A1* | 5/2017 | Martini ............... B60R 19/03 |
| 2017/0203707 A1* | 7/2017 | Fuerst ................ B60R 19/34 |
| 2019/0299888 A1* | 10/2019 | Kim .................. B60R 19/03 |

FOREIGN PATENT DOCUMENTS

| | | | | |
|---|---|---|---|---|
| EP | 2796326 | B1 | 10/2014 | |
| EP | 3002159 | A1 * | 4/2016 | ............ B60R 19/34 |
| EP | 3453597 | B1 * | 7/2020 | ............ B29C 45/26 |
| JP | 2005255044 | A | 9/2005 | |
| JP | 4001071 | B2 | 10/2007 | |
| JP | 2012-250567 | A | 12/2012 | |
| JP | 6265889 | B2 * | 1/2018 | ............ B60R 19/03 |
| KR | 1999-0041867 | U | 12/1999 | |
| KR | 10-1057985 | B1 | 8/2011 | |
| KR | 10-2013-0027684 | A | 3/2013 | |
| KR | 10-2016-0012609 | A | 2/2016 | |
| KR | 101819646 | B1 | 1/2018 | |
| KR | 10-1846920 | B1 | 4/2018 | |
| KR | 10-2018-0105488 | A | 9/2018 | |
| WO | WO-2017021856 | A1 * | 2/2017 | ............ B60R 19/03 |
| WO | WO-2019053621 | A1 * | 3/2019 | ............ B60R 19/18 |
| WO | WO-2019075446 | A1 * | 4/2019 | ............ B60R 19/02 |
| WO | WO-2021165713 | A1 * | 8/2021 | ............ B60R 19/03 |

OTHER PUBLICATIONS

WO-2021165713-A1 computer translation (Year: 2021).*
EP 3002159A1 computer translation (Year: 2015).*
Office Action cited in Korean application No. 10-2020-0128299; Apr. 8, 2025; 10 pp.

* cited by examiner

VEHICLE FRONT BUMPER SYSTEM

CROSS-REFERENCE TO RELATED APPLICATION

This application claims priority to and the benefit of Korean Patent Application No. 10-2020-0128299, filed on Oct. 5, 2020, the entire contents of which are incorporated herein by reference.

FIELD

The present disclosure relates to a front bumper system of a vehicle.

BACKGROUND

The statements in this section merely provide background information related to the present disclosure and may not constitute prior art.

As well-known in the art, a vehicle includes a front compartment which receives a powertrain including an internal combustion engine and/or an electric motor and a transmission. A cooling module including a plurality of heat exchangers (a radiator, a condenser, and an intercooler) and a cooling fan may be located in the front compartment, and the cooling module may be mounted on a front end module (FEM) carrier.

A front grille may be located in front of the cooling module. While the vehicle is driving, ambient air may flow into the cooling module through the front grille, which may cool the cooling module. In addition, a front bumper beam may be located in front of the cooling module so that the bumper beam may absorb impact energy and prevent damage to the cooling module in the event of a vehicle impact/collision.

The front bumper beam may be disposed to at least partially cover the cooling module, and be formed of closed walls. We have discovered that the ambient air flowing into the cooling module during the driving of the vehicle may be blocked by the front bumper beam, and thus cooling performance of the cooling module may be reduced.

The above information described in this background section is provided to assist in understanding the background of the inventive concept, and may include any technical concept which is not considered as the prior art that is already known to those skilled in the art.

SUMMARY

An aspect of the present disclosure provides a vehicle front bumper system allowing ambient air to flow into a cooling module located on the front of the vehicle, thereby improving cooling performance of the cooling module.

According to an aspect of the present disclosure, a vehicle front bumper system may include a bumper beam disposed on a front end of a vehicle, and the bumper beam may have a plurality of openings.

The bumper beam may have a plurality of ribs.

Each rib may have a streamlined cross-section whose thickness gradually decreases from the front of the vehicle toward the rear of the vehicle.

The vehicle front bumper system may further a reinforcing member attached to the bumper beam, and the reinforcing member may extend in a longitudinal direction of the bumper beam.

The reinforcing member may have a streamlined cross-section whose thickness gradually decreases from the front of the vehicle toward the rear of the vehicle.

The reinforcing member may be at least partially embedded into the bumper beam so that the reinforcing member and the bumper beam may form a unitary one-piece structure.

The reinforcing member may be made of a fiber-reinforced composite material.

The reinforcing member may have a middle portion and both end portions made of different types of fiber-reinforced composite materials.

The vehicle front bumper system may further include a pair of first mounting plates connected to both end portions of the reinforcing member, respectively; and a pair of second mounting plates connected to the pair of first mounting plates, respectively.

Each first mounting plate may have a groove in which each end portion of the reinforcing member is received, and the end portion of the reinforcing member and the groove of the first mounting plate may be joined by a structural adhesive.

Each first mounting plate may have a pair of flanges, and each second mounting plate may be connected to the pair of flanges of the corresponding first mounting plate.

The bumper beam may be made of an aluminum material.

The bumper beam may be made of a plastic material.

The bumper beam may include: a middle portion overlapping a cooling module; and a pair of closed walls located on both sides of the middle portion.

Further areas of applicability will become apparent from the description provided herein. It should be understood that the description and specific examples are intended for purposes illustration only and are not intended to limit the scope of the present disclosure.

DRAWINGS

In order that the disclosure may be well understood, there will now be described various forms thereof, given by way of example, reference being made to the accompanying drawings, in which.

Figure 1:
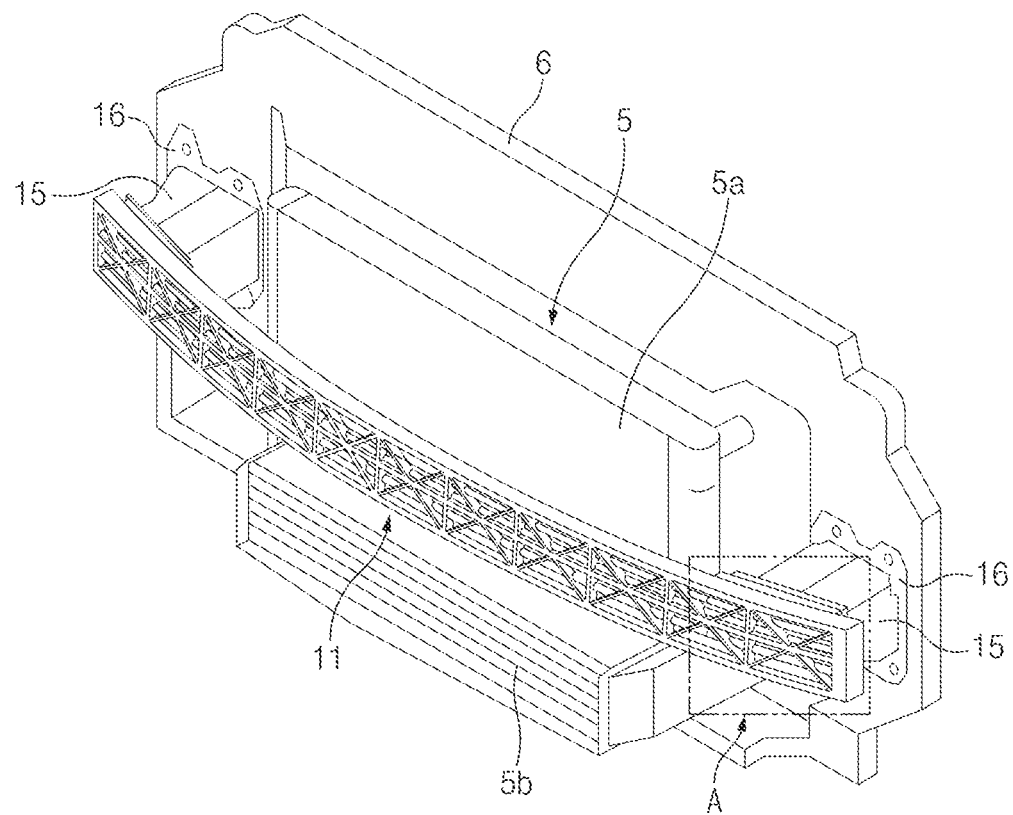
FIG. 1 illustrates a perspective view of a vehicle front bumper system according to exemplary form of the present disclosure.
Figure 2:
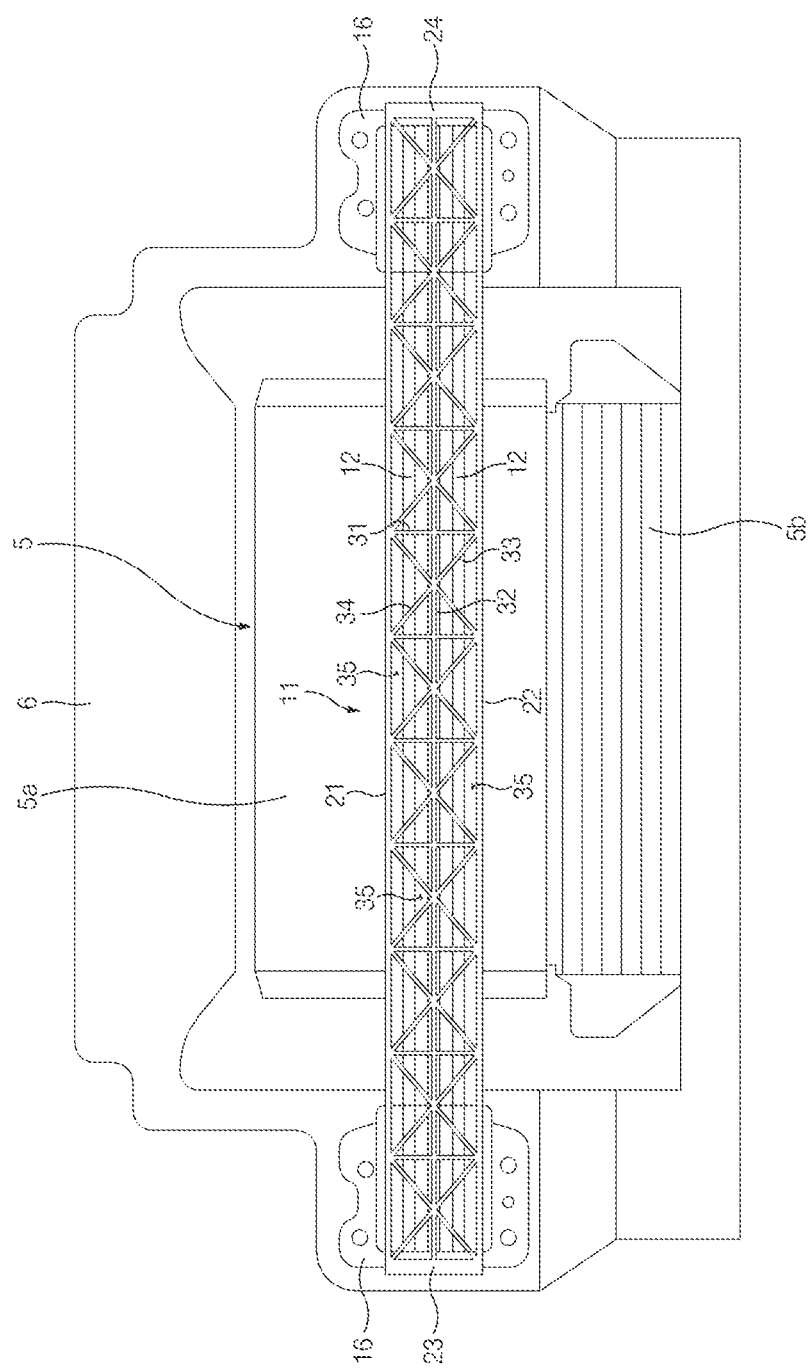
FIG. 2 illustrates a front view of the vehicle front bumper system illustrated in FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

A vehicle front bumper system according to an exemplary form of the present disclosure may include a bumper beam 11 disposed on a front end of the vehicle.

Referring to FIG. 1, the bumper beam 11 may extend in a width direction of the vehicle, and the bumper beam 11 may be adjacent to a cooling module 5. In particular, the bumper beam 11 may be located in front of the cooling module 5, and the bumper beam 11 may be disposed to partially cover the cooling module 5. The bumper beam 11 may be a long beam of which the length greater than the height and the width of the bumper beam. The bumper beam 11 may include a plurality of openings 35 which are open to the cooling module 5.

The cooling module 5 may be mounted on a front end module (FEM) carrier 6. Both ends of the bumper beam 11 may be connected to the REM carrier 6 through a pair of crash boxes 15 and a pair of mounting brackets 16.

Figure 10:
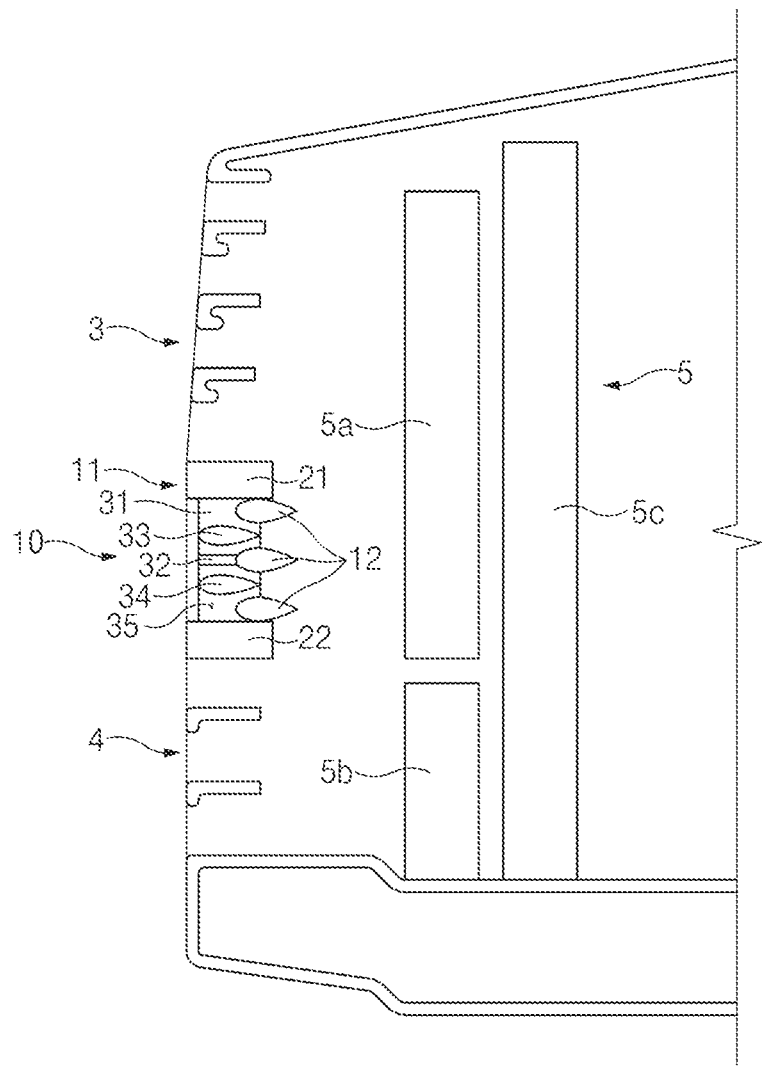
FIG. 10 illustrates a cross-sectional view of a vehicle front bumper system according to an exemplary form of the present disclosure.

Referring to FIG. 10, the cooling module 5 may be disposed within front compartment 2 of the vehicle, and the front compartment 2 may receive an internal combustion engine and/or an electric motor, a transmission, and other components. One or more front grilles 3 and 4 may be located in front of the front compartment 2, and the cooling module 5 may be disposed to face the front grilles 3 and 4.

According to the exemplary form illustrated in FIG. 10, a front upper grille 3 may be disposed above the bumper beam 11, and a front lower grille 4 may be disposed below the bumper beam 11.

According to another exemplary form, the front upper grille 3 may be disposed above the bumper beam 11, and a lower closed wall may be disposed below the bumper beam 11.

According to another exemplary form, an upper closed wall may be disposed above the bumper beam 11, and the front lower grille 4 may be disposed below the bumper beam 11.

The bumper beam 11 may include a first wall 21 facing the top of the vehicle, a second wall 22 facing the bottom of the vehicle, a third wall 23 facing the right side of the vehicle, and a fourth wall facing the left side of the vehicle. The bumper beam 11 may include a plurality of ribs 31, 32, 33, and 34 extending within an area defined by the first wall 21, the second wall 22, the third wall 23, and the fourth wall 24, and the plurality of ribs 31, 32, 33, and 34 may define the plurality of openings 35. Ambient air may flow into the cooling module 5 through the plurality of openings 35. As the air flows through the openings 35 of the bumper beam 11, air resistance may decrease, and thus cooling performance of the cooling module 5 may be significantly improved.

The plurality of ribs 31, 32, 33, and 34 may include a plurality of first ribs 31, a plurality of second ribs 32, a plurality of third ribs 33, and a plurality of fourth ribs 34. Each first rib 31 may extend vertically between the first wall 21 and the second wall 22, and the plurality of first ribs 31 may be spaced apart from each other in a longitudinal direction of the bumper beam 11. Each second rib 32 may extend between the third wall 23 and the fourth wall 24, and the plurality of second ribs 32 may extend horizontally in the longitudinal direction of the bumper beam 11. Each third rib 33 may extend obliquely between the first wall 21 and the second wall 22, and the plurality of third ribs 33 may be spaced apart from each other in the longitudinal direction of the bumper beam 11. Each fourth rib 34 may extend obliquely between the first wall 21 and the second wall 22, and the plurality of fourth ribs 34 may be spaced apart from each other in the longitudinal direction of the bumper beam 11. The inclination direction of each third rib 33 may be symmetrical to the inclination direction of each fourth rib 34, and the third rib 33 may intersect with the fourth rib 34. The weight of the bumper beam 11 may be reduced by the plurality of openings 35, and stiffness and/or strength of the bumper beam 11 may be increased by the plurality of ribs 31, 32, 33, and 34.

Figure 7:
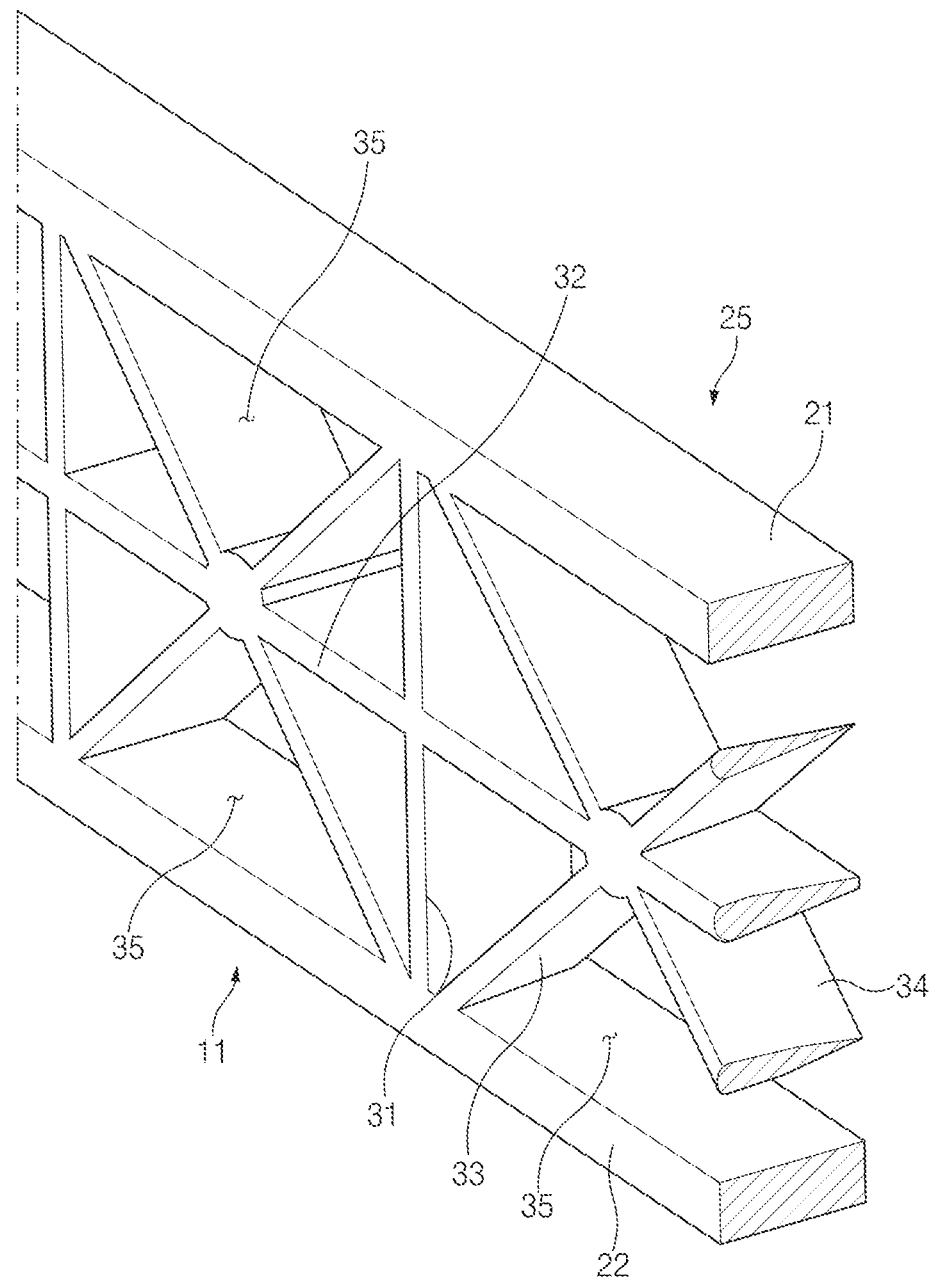
FIG. 7 illustrates a partially cut-away perspective view of a bumper beam in a vehicle front bumper system according to an exemplary form of the present disclosure.

Each of the ribs 31, 32, 33, and 34 may have a streamlined cross-section whose thickness gradually decreases from the front of the vehicle toward the rear of the vehicle. As illustrated in FIG. 7, at least some ribs 32, 33, and 34 may have a streamlined cross-section such as a water drop shape. In particular, the water-drop-shaped cross-section of some ribs 32, 33, and 34 may be easily formed using a draft angle with respect to a mold parting line. As a result, the bumper beam 11 may achieve significantly improved stiffness with weight reduction. Meanwhile, an drag coefficient for an object having a circular cross-section is 0.47, and an drag coefficient for an object having a water-drop-shaped cross-section is 0.04. Thus, the bumper beam 11 having the water-drop-shaped cross-section may maximize the amount of airflow by minimization of drag.

The vehicle front bumper system 10 according to an exemplary form of the present disclosure may further include a plurality of reinforcing members 12 attached to the bumper beam 11. Thus, the stiffness and/or strength of the bumper beam 11 may be increased by the plurality of reinforcing members 12.

Each reinforcing member 12 may extend in the longitudinal direction of the bumper beam 11, and the plurality of reinforcing members 12 may be spaced apart from each other in a height direction of the bumper beam 11. The plurality of reinforcing members 12 may be attached to both ends of the bumper beam 11 through a pair of first mounting plates 13, and the plurality of reinforcing members 12 may be attached to the pair of crash boxes 15 through a pair of second mounting plates 14.

Figure 8:
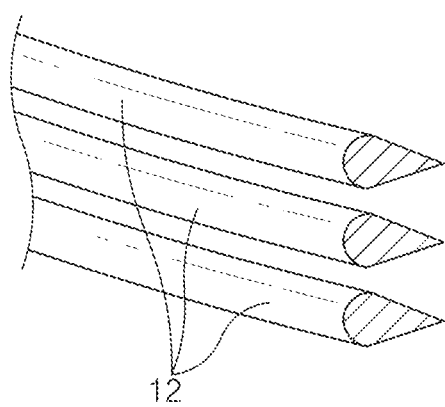
FIG. 8 illustrates a partially cut-away perspective view of reinforcing members in a vehicle front bumper system according to an exemplary form of the present disclosure.

Referring to FIG. 8, each reinforcing member 12 may have a streamlined cross-section whose thickness gradually decreases from the front of the vehicle toward the rear of the vehicle. In particular, the reinforcing member 12 may have a streamlined cross-section such as a water drop shape. In particular, the water-drop-shaped cross-section of the reinforcing member 12 may be easily formed using a draft angle with respect to a mold parting line. As a result, the reinforcing member 12 may achieve significantly improved stiffness with weight reduction. Meanwhile, an drag coefficient for an object having a circular cross-section is 0.47, and an drag coefficient for an object having a water-drop-shaped cross-section is 0.04. Thus, the reinforcing member 12 having the water-drop-shaped cross-section may increase or maximize the amount of airflow by reducing or minimizing drag.

Figure 3:
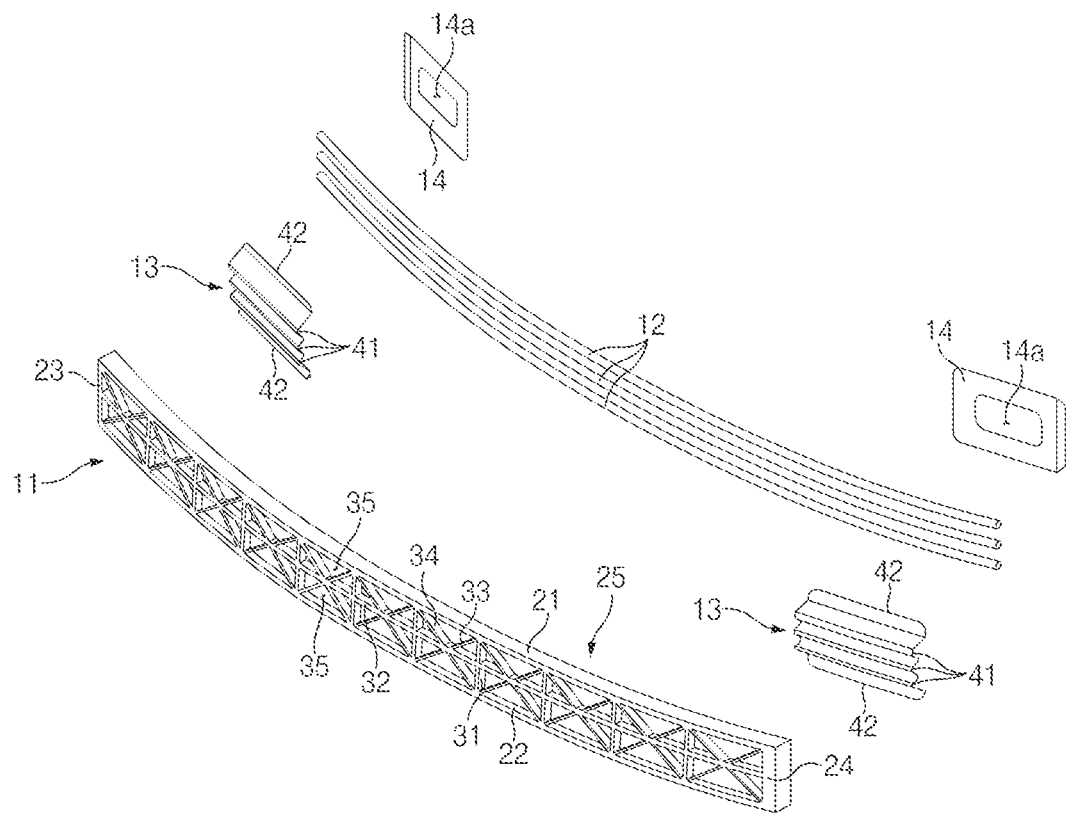
FIG. 3 illustrates an exploded perspective view of a bumper beam, a plurality of reinforcing members, a pair of first mounting plates, and a pair of second mounting plates in the vehicle front bumper system illustrated in FIG. 1.
Figure 4:
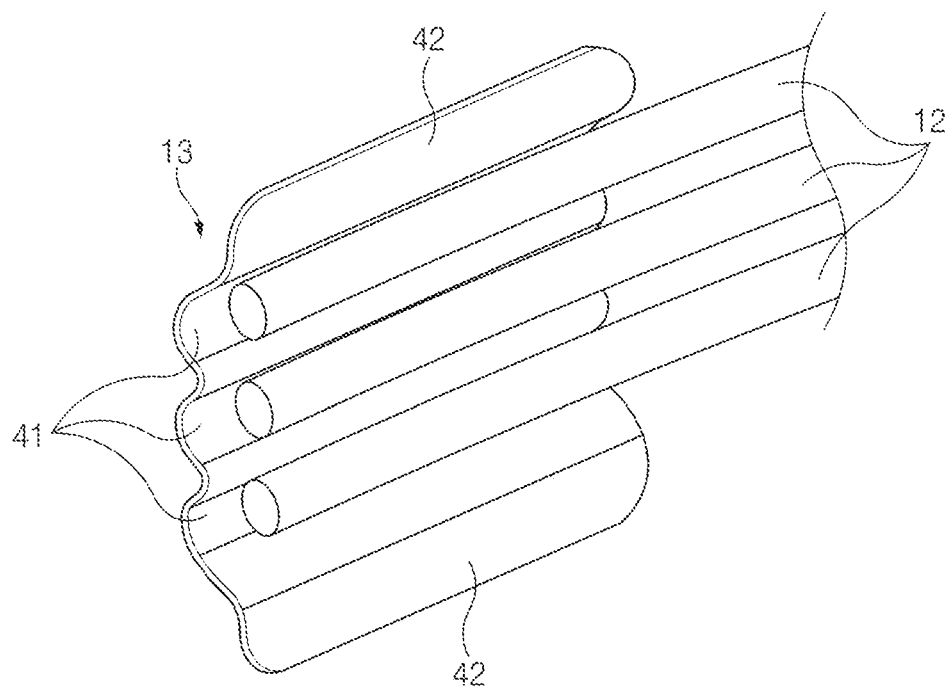
FIG. 4 illustrates a structure in which a plurality of reinforcing members are mounted on a first mounting plate in a vehicle front bumper system according to an exemplary form of the present disclosure.

Referring to FIG. 3, the pair of first mounting plates 13 may be connected to both end portions of the reinforcing member 12, respectively. Referring to FIG. 4, each first mounting plate 13 may have a plurality of grooves 41 in which the end portions of the plurality of reinforcing members 12 are received, respectively, and the plurality of grooves 41 may be spaced apart from each other in a height direction of the first mounting plate 13. The first mounting plate 13 may include a pair of flanges 42 provided on top and bottom ends thereof, respectively. For example, each end portion of the reinforcing member 12 and the groove 41 of the first mounting plate 13 may be joined by a structural adhesive. As another example, each end portion of the reinforcing member 12 and the groove 41 of the first mounting plate 13 may be joined by using fasteners or welding.

Figure 5:
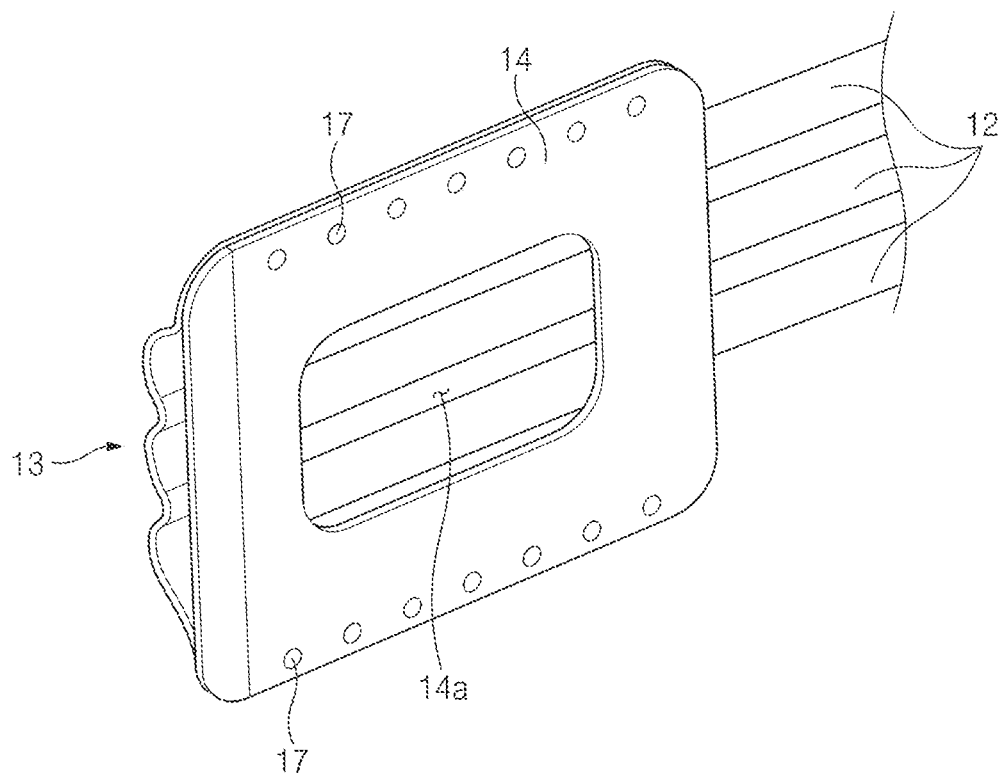
FIG. 5 illustrates a structure in which a second mounting plate is mounted on a first mounting plate in a vehicle front bumper system according to an exemplary form of the present disclosure.

The pair of second mounting plates 14 may be coupled to the pair of first mounting plates 13, respectively. Referring to FIG. 5, each second mounting plate 14 may have a center opening 14a in a central portion thereof, and accordingly the weight of the second mounting plate 14 may be reduced. Each second mounting plate 14 may be coupled to the flanges 42 of the corresponding first mounting plate 13 using fasteners, welding, adhesive, and/or the like. For example, the second mounting plate 14 may be connected to the flanges 42 of the first mounting plate 13 through rivets or self-piercing rivets 17. Each second mounting plate 14 may be mounted on a front end of the corresponding crash box 15 by welding, using fasteners, and/or the like.

According to an exemplary form, the reinforcing member 12 may be made of a fiber-reinforced composite material including continuous fibers such as carbon fiber, aramid fiber, and and glass fiber, or a heterogeneous fiber in which two or more different fibers are mixed. For example, the reinforcing member 12 may be made of a fiber-reinforced composite material such as carbon fiber reinforced polymer (CFRP) composite.

Figure 9:
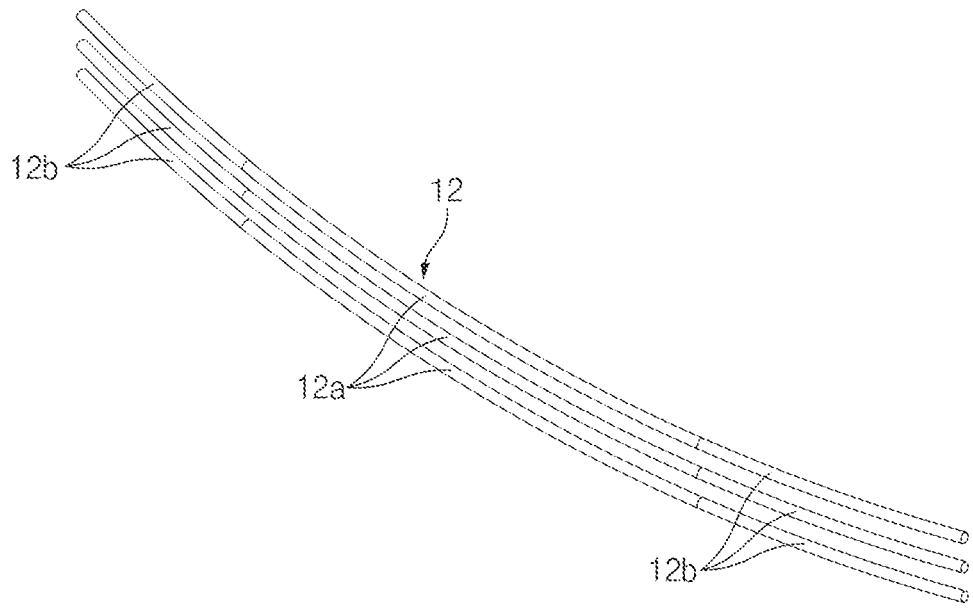
FIG. 9 illustrates a perspective view of reinforcing members in a vehicle front bumper system according to an exemplary form of the present disclosure.

According to another exemplary form, as illustrated in FIG. 9, the reinforcing member 12 may have a middle portion 12a and both opposing end portions 12b made of different types of fiber-reinforced composite materials. For example, the middle portion 12a of the reinforcing member 12 may be made of a first composite material including high-toughness fibers, such as aramid fiber reinforced polymer composite, and the opposing end portions 12b of the reinforcing member 12 may be made of a second composite material including high-stiffness and high-strength fibers, such as carbon fiber reinforced polymer composite.

Figure 6:
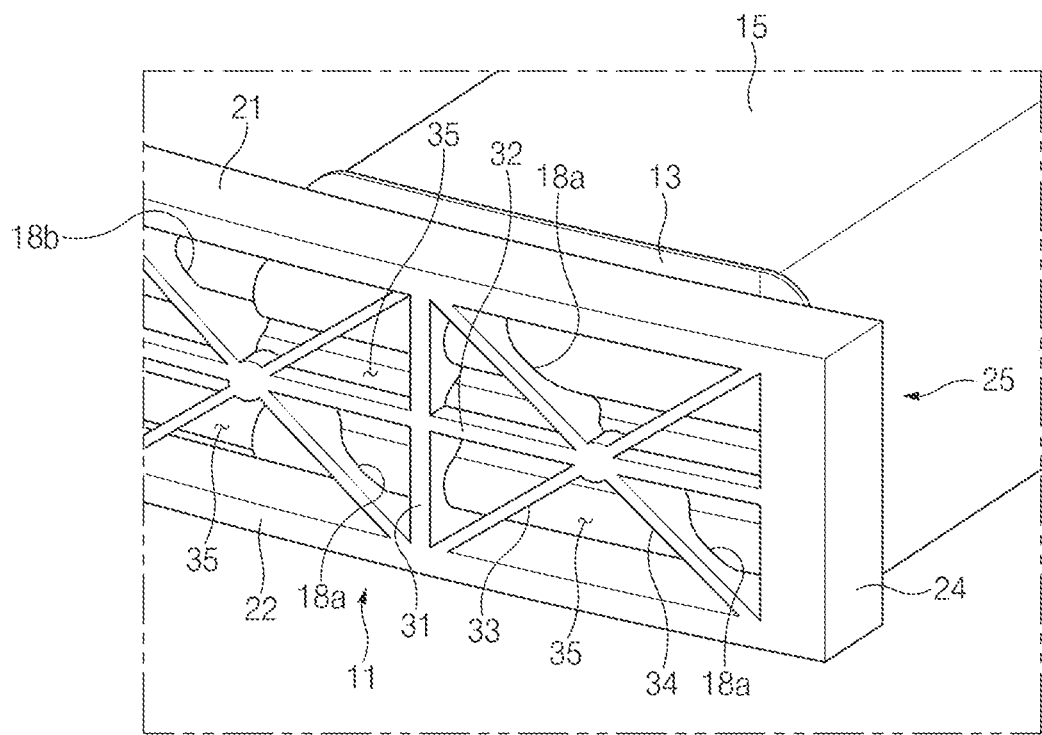
FIG. 6 illustrates an enlarged view of portion A of FIG. 1.

The super beam 11 may be made of a lightweight material which is easily used for casting. For example, the bumper beam 11 may be made of a light metal such as aluminum. As another example, the bumper beam 11 may be made of a synthetic resin such as plastic. After the first and second mounting plates 13 and 14 are mounted on both end portions of the reinforcing members 12, the first and second mounting plates 13 and 14 and the reinforcing members 12 may be integrally connected to the bumper beam 11 by insert molding so that the first mounting plates 13 may be at least partially embedded into the ribs 31, 32, 33, and 34 of the bumper beam 11 (see 18a in FIG. 6) and the reinforcing members 12 may be at least partially embedded into the ribs 31, 32, 33, and 34 of the bumper beam 11 (see 18b in FIG. 6). As a result, the bumper beam 11, the reinforcing members 12, the first mounting plates 13, and the second mounting plates 14 may form a unitary one-piece structure, and thus the stiffness and/or strength of the vehicle front bumper system may be significantly improved.

Figure 11:
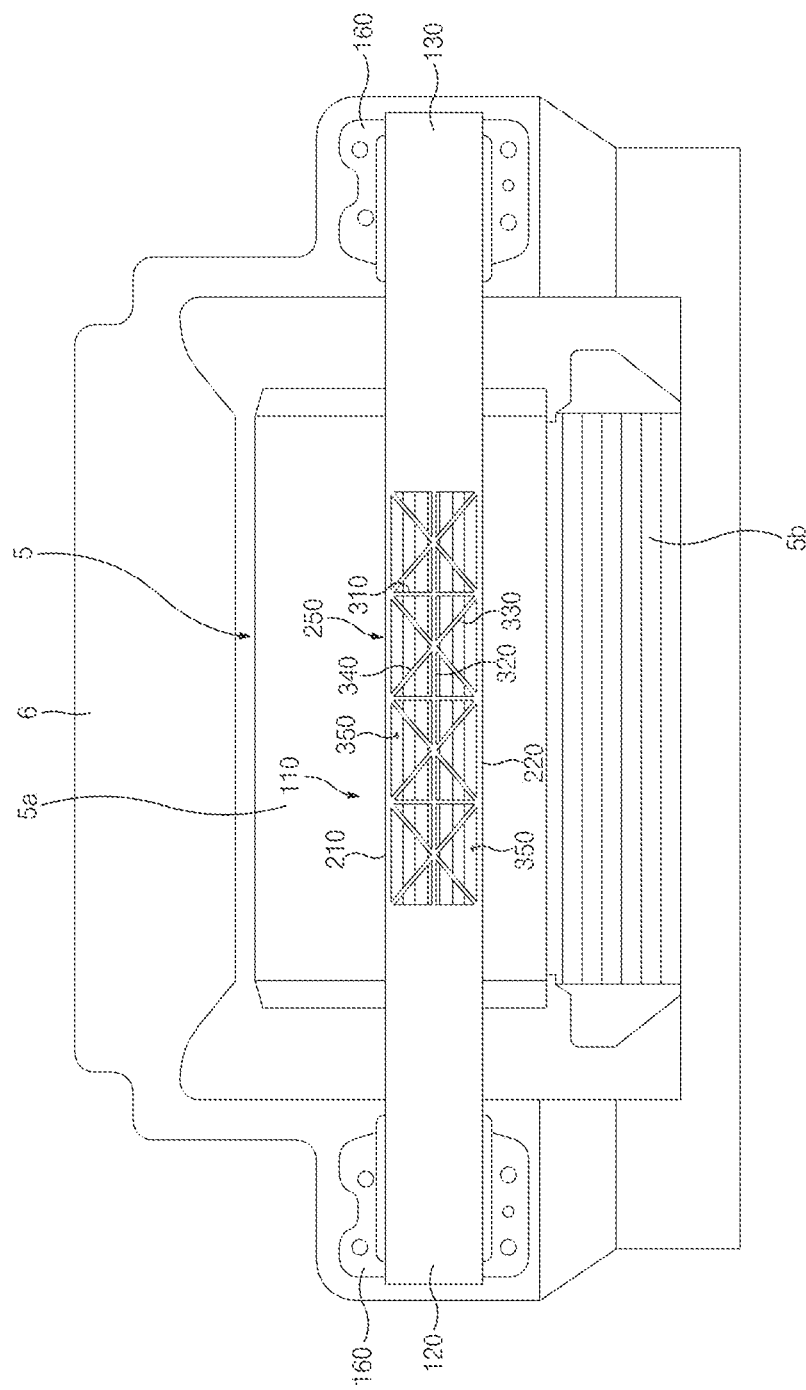
FIG. 11 illustrates a front view of a vehicle front bumper system according to another exemplary form of the present disclosure.

Referring to FIG. 11, a vehicle front bumper system according to another exemplary form of the present disclosure may include a bumper beam 110 having a middle portion 250 overlapping the cooling module 5, and a pair of closed walls 120 and 130 are located on both sides of the middle portion 250.

In one form, the middle portion 250 may be directly overlapped with the cooling module 5. The middle portion 250 may include a first wall 210 facing the top of the vehicle and a second wall 220 facing the bottom of the vehicle. In other words, the first wall 210 may be arranged above the second wall 220 in a vertical direction of the vehicle. The first wall 210 and the second wall 220 may be spaced apart from each other. The pair of closed walls 120 and 130 may not be directly overlapped with the cooling module 5.

As the middle portion 250 is directly overlapped with the cooling module 5, the middle portion 250 may have a plurality of openings 350 allowing ambient air to flow into the cooling module 5, and the plurality of openings 350 may directly face the cooling module 5. The plurality of openings 350 may be defined by a plurality of ribs 310, 320, 330, and 340. The plurality of ribs 310, 320, 330, and 340 may extend within an area defined by the first wall 210, the second wall 220, and the pair of closed walls 120 and 130.

Since the pair of closed walls 120 and 130 are not overlapped with the cooling module 5, they may not have a plurality of opening. Both end portions of the reinforcing members 12, the first mounting plates 13, and the second mounting plates 14 may be connected to the pair of closed walls 120 and 130.

According to another exemplary form, the plurality of openings 350 may only be formed in the middle portion of the bumper beam 110 which directly faces the cooling module 5, and both end portions of the bumper beam 110 may be closed. Thus, a manufacturing process of the bumper beam 110 may be simplified, and manufacturing costs thereof may be reduced.

As set forth above, according to exemplary forms of the present disclosure, the bumper beam may have the plurality of openings which are open toward the cooling module, and accordingly the amount of air flowing through the cooling module may be increased. Thus, the cooling performance of the cooling module may be significantly improved.

According to exemplary forms of the present disclosure, the bumper beam may have the plurality of ribs by which the plurality of openings are defined, and the stiffness and/or strength of the bumper beam may be improved by the plurality of ribs. In addition, the plurality of reinforcing members may be integrally attached to the bumper beam, which significantly improves impact-absorbing performance in the event of a low-speed impact/collision of the vehicle.

According to exemplary forms of the present disclosure, although the materials of the reinforcing member and the bumper beam are relatively expensive, the cooling performance of the cooling module may be improved by the openings of the bumper beam, so the sizes of heat exchangers and a cooling fan constituting the cooling module may be reduced. Thus, the overall manufacturing cost of the vehicle may be reduced.

According to exemplary forms of the present disclosure, as the bumper beam has the plurality of openings, the degree of freedom in position of the bumper beam may be increased, so the degree of freedom in design of the front bumper system may be improved.

According to exemplary forms of the present disclosure, the reinforcing members may be made of fiber-reinforced composites, and the weight of the bumper beam may be reduced by the plurality of openings, so the weight reduction of the front bumper system may be effectively achieved. The weight reduction of the front bumper system may contribute to uniform weight distribution with respect to the front and rear of the vehicle, improvement of fuel economy, and the like.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A front bumper system of a vehicle, comprising:
a bumper beam disposed on a front end of the vehicle;
a reinforcing member attached to the bumper beam;
a pair of first mounting plates connected to both end portions of the reinforcing member, respectively; and
a pair of second mounting plates connected to the pair of first mounting plates, respectively,
wherein the reinforcing member extends in a longitudinal direction of the bumper beam,
wherein the bumper beam includes a plurality of openings through which air flows from outside the vehicle to inside the vehicle such that an air resistance is reduced and cooling performance is increased, and
wherein:
each first mounting plate of the pair of first mounting plates has a groove in which each end portion of the reinforcing member is received,
the end portion of the reinforcing member and the groove of the first mounting plate are joined by a structural adhesive,
each first mounting plate of the pair of first mounting plates has a pair of flanges, and
each second mounting plate of the pair of second mounting plates is connected to the pair of flanges of a corresponding first mounting plate among the pair of first mounting plates.

2. The front bumper system according to claim 1, wherein the bumper beam further includes a plurality of ribs.

3. The front bumper system according to claim 2, wherein each rib of the plurality of ribs has a streamlined cross-section whose thickness gradually decreases from a front of the vehicle toward a rear of the vehicle.

4. The front bumper system according to claim 1, wherein the reinforcing member has a streamlined cross-section whose thickness gradually decreases from a front of the vehicle toward a rear of the vehicle.

5. The front bumper system according to claim 1, wherein the reinforcing member is at least partially embedded into the bumper beam so that the reinforcing member and the bumper beam form a unitary one-piece structure.

6. The front bumper system according to claim 1, wherein the reinforcing member is made of a fiber-reinforced composite material.

7. The front bumper system according to claim 1, wherein the reinforcing member has a middle portion and end portions, which are made of different fiber-reinforced composite materials.

8. The front bumper system according to claim 1, wherein the bumper beam is made of an aluminum material.

9. The front bumper system according to claim 1, wherein the bumper beam is made of a plastic material.

10. The front bumper system according to claim 1, wherein the bumper beam includes:
a middle portion overlapping a cooling module; and
a pair of closed walls located on both sides of the middle portion.

* * * * *